United States Patent [19]

Tallman

[11] 4,232,377
[45] Nov. 4, 1980

[54] MEMORY PRESERVATION AND VERIFICATION SYSTEM

[75] Inventor: James L. Tallman, Hillsboro, Oreg.
[73] Assignee: Tektronix, Inc., Beaverton, Oreg.
[21] Appl. No.: 30,509
[22] Filed: Apr. 16, 1979
[51] Int. Cl.² .................................................. G11C 13/00
[52] U.S. Cl. ......................................: 365/229; 365/222; 307/150
[58] Field of Search ............... 365/222, 189, 226, 227, 365/228, 229; 307/150

[56] References Cited
U.S. PATENT DOCUMENTS
4,122,359  10/1978  Brekss ................................. 365/229

Primary Examiner—Terrell W. Fears
Attorney, Agent, or Firm—George T. Noe

[57] ABSTRACT

A memory preservation and verification system is provided in which memory contents are verified as being valid following an interruption and subsequent reapplication of operating power. A backup power supply is provided to maintain the status of the memory contents during the interruption or loss of a main power supply. First and second mathematically related numbers are generated and stored in memory locations. These numbers are subsequently retrieved and the mathematical relationship therebetween checked to provide the verification of the status of data in the memory.

2 Claims, 1 Drawing Figure

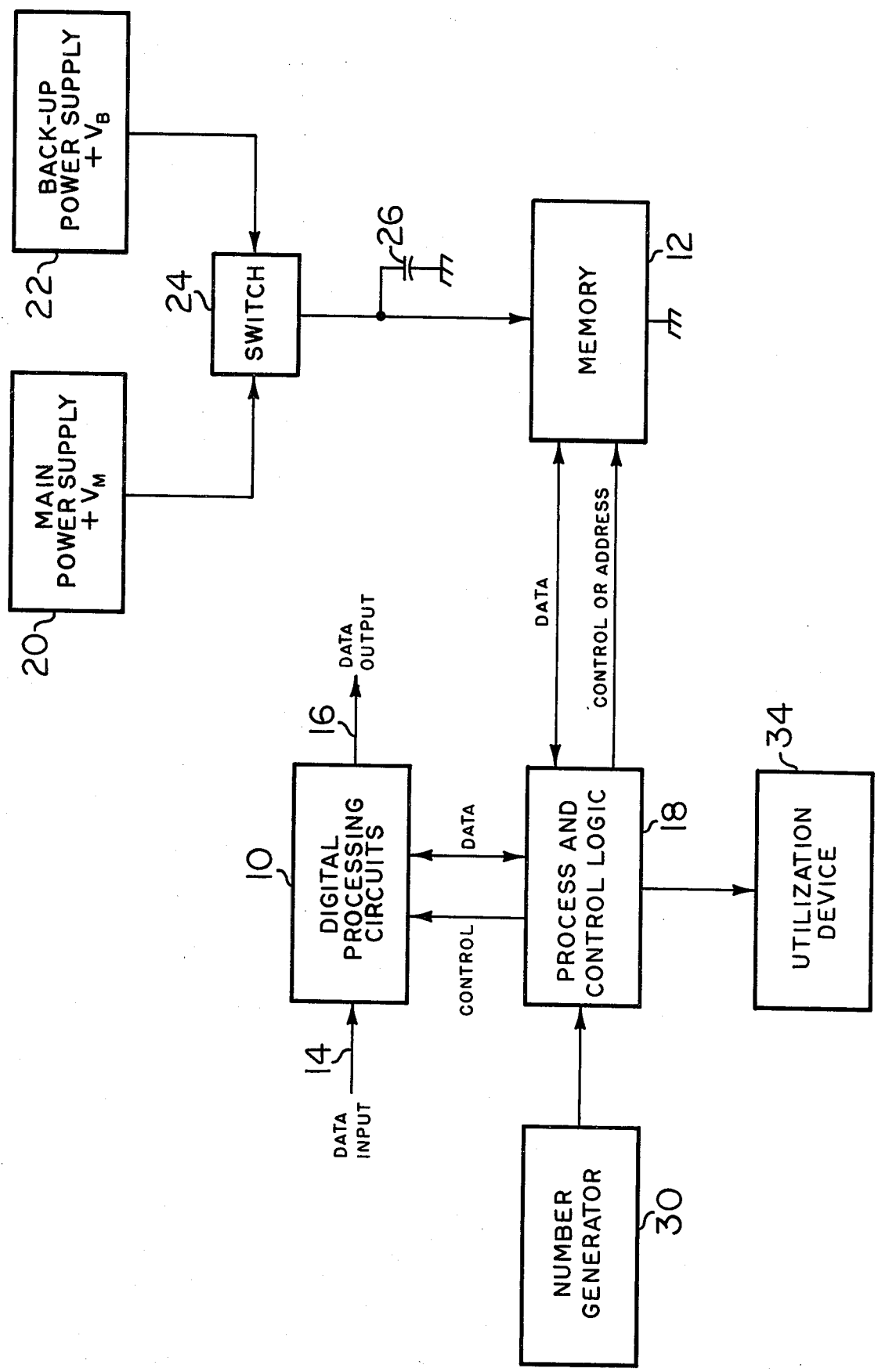

MEMORY PRESERVATION AND VERIFICATION SYSTEM

BACKGROUND OF THE INVENTION

Because of advances in the state of the art of semiconductor technology in terms of size, cost, and power-consumption reduction, it is advantageous to incorporate digital processing and computational systems into electrical apparatus of all kinds. A problem associated with such systems is that when operating power is interrupted or turned off, data contained in system memories is lost. This problem was solved to some extent by providing back-up battery power to the memory devices to preserve the data stored therein. A further problem, however, is to ensure that the stored data is correct or valid upon re-application of operating power. It has been suggested to store a known data word and verify it as being valid before any data processing is recommenced. However, such a known data word may always be the same and may always be stored at the same memory location, and through some undetermined physical characteristic associated with the memory device, the storage location of the memory device may take a set of the known data word, analogous to a stored latent image on a display device. This leads to the danger of the known data word being produced by the memory for verification upon reapplication of operating power, even though the contents of the memory may have been destroyed during the loss of operating power.

SUMMARY OF THE INVENTION

In accordance with the present invention, a memory preservation and verification system is provided in which memory contents are verified as being valid following an interruption and subsequent re-application of operating power.

In an electrical apparatus which incorporates digital processing circuits, a backup power supply is provided to maintain the status of memory contents during the interruption or loss of a main power supply. A pseudo-random digital number $N_1$ is generated and operated on in a particular manner to provide a second digital number $N_2$ which is uniquely related to $N_1$. The digital numbers $N_1$ and $N_2$ are stored in preselected adjacent first and second memory locations respectively and are maintained in these locations during normal operation of the apparatus. At any time, the memory status may be checked by retrieving the digital numbers $N_1$ and $N_2$ and checking the relationship between the two numbers. It is particularly important to check this relationship following interruption or loss of main power during which time a backup power supply, such as a battery, is used to preserve data stored in the system memories. A correct relationship between digital numbers $N_1$ and $N_2$ is verification that the status of data in memory has been preserved.

It is therefore one object of the present invention to provide a novel system for memory data preservation and verification.

It is another object to provide a memory preservation and verification system in which pseudo-randomly generated digital numbers may be stored in preselected memory locations for later verification.

It is another object to provide a memory preservation and verification system in which memory contents are verified as being valid following an interruption and subsequent re-application of main operating power by storing a random digital number and a particular code number derived therefrom in adjacent memory locations and later verifying the relationship between the digital number and code number.

Other objects and advantages of the present invention will become apparent upon a reading of the following description when taken in conjunction with the drawing.

BRIEF DESCRIPTION OF THE DRAWING

The single FIGURE is a functional block diagram of the preferred embodiment of a memory preservation system in accordance with the present invention.

DETAILED DESCRIPTION OF THE PREFERRED EMBODIMENT

The memory preservation and verification system of the present invention may be embodied in any electronic apparatus such as computational or measurement instruments or data transmission equipment in which there are digital processing circuits 10 and a memory device 12. The digital processing circuits 10 may therefore be any arrangement of logic gates, shift registers, flip flops, and so forth, to perform whatever digital signal processing that is required. Input data is applied to the digital processing circuits 10 over input lines 14 and processed data may be output on data lines 16. The input and output lines 14 and 16 respectively may be the same data bus. The digital processing circuits 10 may also include process and control logic circuits; however, in this embodiment there is shown a separate process and control logic circuit 18 not only to facilitate the description but because such process and control logic circuit 18 could be separate microprocessor or computer hardware. These circuits are conventional and well known in the art; therefore, no detailed description of these circuits is given here.

The memory device 12 in its most simple form may be one or more flip flops; however, it is more likely that the memory comprises a random-access memory (RAM) having thousands of addressable memory locations. The memory device 12 is shown connected between a source of electrical power and ground for energization thereof. The source of electrical power may be either a main power supply 20 or a backup power supply 22, both of which are connected through a switch 24 to the memory device 12. The main power supply 20 may suitably be the power supply of the entire system, while the backup power supply 22 may be either a battery located within the apparatus or an external power supply. The switch 24 suitably may be an electronic switch, such as a pair of transistors connected as a comparator with appropriate biasing and sensing circuits to align the switch to the correct power supply. In normal operation, the main power supply 20 is connected through the switch 24 to the memory 12. If the main power is interrupted or turned off, the backup power supply 22 is switched into the circuit to preserve the data stored in the memory device 12. Since the switching action of switch 24 cannot be instantaneous, a capacitor 26 is provided to maintain operating power during the switch over and thereby prevent destruction of stored data.

A number generator 30 may be provided to generate digital numbers in a pseudo-random fashion. Such number generator may be, for example, a counter circuit which is cycled continuously. The process and control logic circuit 18 accepts a digital number $N_1$ from a number generator 30 and operates on this number in a particular manner to provide a second digital number $N_2$ which is uniquely related to $N_1$. The digital numbers $N_1$ and $N_2$ are stored in the memory device 12 in preselected first and second memory locations respectively, and are maintained in these locations during normal operation of the apparatus during which time main power supply 20 provides operating power to the memory. Data being processed by the digital processing circuits 10 may be stored in the memory in the conventional manner. The memory status may be checked at any time by retrieving the digital numbers $N_1$ and $N_2$ and checking the relationship between the two numbers. This may be done by first retrieving the digital number $N_1$, operating on the number $N_1$ in the same particular manner as originally performed to provide a new digital number $N_2$, and then comparing the new digital number $N_2$ with the originally stored digital number $N_2$. If the numbers match, it is an indication that the data stored in the memory 12 has been properly preserved. It is particularly important to check this relationship following a power interruption or loss of main operating power during which time the backup power supply is used to preserve data stored in the system memory. A utilization device 34 is coupled to the process and control logic circuit 18 to provide an indication of either verification or non-verification of preservation of the memory status. For example, utilization device 34 could be an indicator light, or an alarm, or a reset switch, or some device such as a cathode-ray-tube display or a printer which provides visual indication to an operator.

The preferred embodiment of the memory preservation and the verification system described herein above has universal application. The system as described is embodied in an oscilloscope having digital computational capability. Thus the digital processing circuits 10 and the process and control logic circuits 18 comprise a microprocessor and its associated circuits. The memory 12 is a back of random-access memories. Main power supply 20 is the power supply for the entire oscilloscope. The number generator 30 is the counter circuits which drive an associated keyboard. The utilization device 34 is the cathode ray tube of the oscilloscope. Since only a portion of the memory is checked in the verification process, the presumption that valid data is stored in the remainder of the memory is based on probability. Severable steps are taken to ensure a high degree of probability that the data is valid. First, the digital numbers $N_1$ and $N_2$ are 8-bit digital numbers. The process and control logic circuit 18 analyzes the number $N_1$ and rejects a number which is all zeros or all ones. Therefore, the stored numbers will contain both zeros and ones, eliminating the probability that a memory containing all ones or all zeros upon a subsequent power up will be used in the verification process. The operation which takes place in producing the second digital number $N_2$ is generating the complement of the first digital number $N_1$. That is, any zeros in the number $N_1$ are converted to ones for the number $N_2$, and the ones of the first number $N_1$ are converted to zeros for the number $N_2$. The two numbers $N_1$ and $N_2$ are stored in a preselected first and second memory locations, which memory locations are adjacent to each other. It is believed that this situation actually increases the chances of memory destruction during a power interruption, so that, conversely, a positive verification upon a subsequent power up increases the probability that data stored in the rest of the memory is valid. Also, the use of complementary digital numbers $N_1$ and $N_2$ simplifies the verification process in that the digital numbers $N_1$ and $N_2$ may be compared directly without generating a new digital number $N_2$.

In summary, it can be seen that a memory preservation and verification system has been shown and described herein. It will be obvious to those having ordinary skill in the art that many changes may be made in the details of the herein above-described preferred embodiment of the present invention. Therefore, the scope of the present invention should be determined only by the following claims.

What I claim as being novel is:

1. A memory preservation and verification system comprising:
    power supply means coupled to said memory for energization thereof, said power supply means including a main power supply and a backup power supply;
    means for generating a first digital number;
    process and control logic means for generating a second digital number and storing both of said first and second digital numbers in said memory, said second digital number being mathematically related to said first digital number;
    said process and control logic means also for retrieving said first and second digital numbers and checking the relationship therebetween to thereby provide a verification of the validity of the contents of said memory; and
    utilization means for providing an indication of said verification.

2. A memory preservaton and verification system in accordance with claim 1 wherein said power supply means further includes switch means for coupling one of said main power supply and backup power supply to said memory and switching to the other of said power supplies under predetermined conditions.

* * * * *